UNITED STATES PATENT OFFICE.

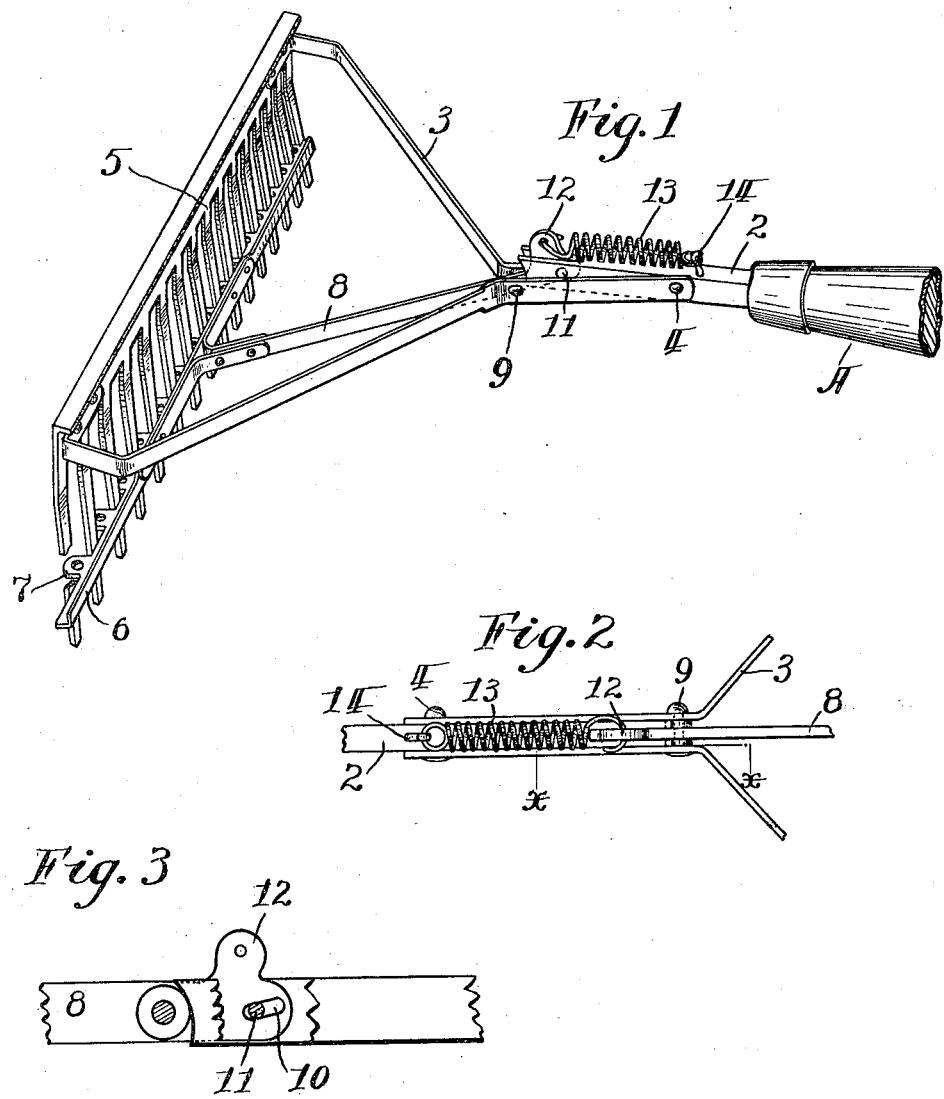

SAMUEL L. STETSON, OF ST. PAUL, MINNESOTA.

RAKE.

1,244,789.         Specification of Letters Patent.      Patented Oct. 30, 1917.

Application filed January 29, 1916. Serial No. 75,005.

*To all whom it may concern:*

Be it known that I, SAMUEL L. STETSON, a citizen of the United States, residing at St. Paul, in the county of Ramsey and State of Minnesota, have invented certain new and useful Improvements in Rakes, of which the following is a specification.

My invention relates to improvements in rakes, its object being to provide improved means for cleaning grass, etc., from the teeth of the rake with the minimum amount of inconvenience, and to this end consists in an improved coöperative working combination between the tooth supporting head of the rake and the cleaning device which will permit the grass or other collection being forced from the teeth of the rake by the user without moving the hands from an ordinary holding position in connection with the rake handle.

To this end the invention consists in the features of construction, combination, and arrangement of parts hereinafter described and claimed.

In the accompanying drawings forming part of this specification,

Figure 1 is a perspective view of the tooth end of a rake embodying my features of invention;

Fig. 2 is a plan view of the connecting portion of the handle and tooth end of a rake; and Fig. 3 is a section on line $x$—$x$ of Fig. 2.

Referring to the drawings, A represents a rake handle formed with an extending member or bar 2 constituting a support for the tooth end of the rake. The tooth end of the rake consists of the frame bars 3 having pivotal support 4 at their inner ends upon the handle extension 2 and at their outer ends supporting in the ordinary member the downwardly projecting rake teeth 5.

6 represents a comb of suitable construction arranged in connection with the teeth, the comb in the drawings being shown in the form of a strip or bar with forwardly extending teeth 7 standing between the rake teeth. The comb is carried by a central bar 8 which short of its rear end has fulcrum support 9 in the tooth rake supporting side bars 3. The extreme rear end of the bar 8 has slot and pin connection 10—11 with the adjacent end of the handle extension 2. A lug 12 projects upwardly from the rear end of the bar 8 and is connected by a coil spring 13 with a pin 14 projecting upwardly from the extension end of the handle. As will be noted, the distance between the pivotal connection 9 and the slot and pin connection 10—11 is much less than the distance between the slot and pin connection and the pivotal support 4 of the rake tooth carrying frame.

In operation, a downward throw of the handle will throw or turn the tooth end of the rake downwardly upon its pivotal support 4. As the tooth end of the rake turns on its pivotal support 4 it will by the relative separation of the extreme end of the bar 2 and side bars 3, as illustrated in Fig. 1, lift the rear end of the bar 8, turning said bar 8 upon the fixed pivot 9 and carrying the comb downwardly in connection with the rake teeth to clean them. This movement of the comb support bar 8 is compensated for by the slot and pin connection 10—11 between said bar and the extension 2 of the handle bar. The parts will be returned to normal position by the coil spring 13. The distance between the rake supporting pivot 4 and the slot and pin connection 10—11 being greater than the distance between said slot and pin connection and the comb supporting pivot 9 will cause the movement of the comb to be more rapid than the downward movement of the rake teeth, which will result in the comb passing downwardly past the rake teeth to clean the same. The relative speed of throw of the rake tooth portion and the comb portion will be proportioned, as will be evident, to the distance ratio between said pivot 4 and the slot and pin connection 10—11 and the pivot 9 and said slot and pin connection.

A particular advantage of my invention is that the hands do not need to be moved from the handle to clean the teeth but a simple downward throw of the rake will operate as above described to do the cleaning. Another advantage of my construction is that the comb portion can be made of any desired lightness so as to make it easier to restore the parts to normal position through the influence of the spring 13. It will be evident that the operation of my construction depends entirely upon the throw of the tooth end of the rake which carries with it at a greater speed the cleaning comb, and I thus secure a construction that is to the maximum degree simple and convenient in its operation and one in which the throw ordinarily imparted to a rake by a user of a rake of ordinary construction, to throw off the leaves, will in my construction thoroughly clean or scrape the leaves or other collection from the rake teeth.

I claim:

1. A rake of the class described, comprising a handle portion, a toothed end pivotally supported from said handle portion to swing transversely thereof, a comb pivotally supported in connection with said toothed end to swing therewith but at a greater speed and spring means for restoring said comb and toothed end in normal position.

2. A rake of the class described, comprising a handle portion, a plurality of teeth pivotally supported upon the end of said handle portion to swing transversely thereof, a comb pivotally supported in connection with said teeth and means causing said comb to be moved along said teeth as said teeth are turned on their pivotal support by a transverse throw imparted to the toothed end of the rake.

3. A rake of the class described comprising a handle portion, a toothed portion pivotally supported upon the handle portion at a distance inside the end thereof, a comb member arranged in connection with the rake teeth and pivotally mounted on the supported framework of the rake teeth beyond the handle portion, and a slot and pin connection between the pivotally supported end of said comb portion and the end of the handle portion for the purpose set forth.

4. A rake of the class described comprising a handle portion, a toothed portion pivotally supported upon the handle portion at a distance inside the end thereof, a comb member arranged in connection with the rake teeth beyond the handle portion, a slot and pin connection between the pivotally supported end of said comb member and the end of the handle portion for the purpose set forth, and a spring connection between the slotted supported end of said comb member and the rake handle.

5. A rake of the class described comprising a handle, rake teeth, a supported framework for said rake teeth pivotally mounted upon the handle at a distance short of the end thereof, a comb portion arranged in connection with said teeth formed with a rearwardly extending part fulcrumed in the supporting framework of the rake teeth beyond the end of the handle, and a slot and pin connection between the end of the handle and the pivotally supported end of said comb portion, the distance between said slot and pin connection and the comb portion pivot being less than the distance between said slot and pin connection and the tooth frame supporting pivot.

6. A rake of the class described comprising a handle, rake teeth, a supported framework for said rake teeth pivotally mounted upon the handle at a distance short of the end thereof, a comb portion arranged in connection with said teeth formed with a rearwardly extending part fulcrumed in the supporting framework of the rake teeth beyond the end of the handle, a slot and pin connection between the end of the handle and the pivotally supported end of said comb portion, the distance between said slot and pin connection and the comb portion pivot being less than the distance between said slot and pin connection and the tooth frame supporting pivot, and a spring normally holding the supporting framework of said teeth and comb in alinement with the handle.

In testimony whereof I affix my signature in presence of two witnesses.

SAMUEL L. STETSON.

Witnesses:
H. SWANSON,
H. S. JOHNSON.